United States Patent [19]
Bingel

[11] Patent Number: 5,999,619
[45] Date of Patent: Dec. 7, 1999

[54] SYNTHETIC TERMINATION

[75] Inventor: Thomas Bingel, Belleair Beach, Fla.

[73] Assignee: Paradyne Corporation, Largo, Fla.

[21] Appl. No.: 08/992,351

[22] Filed: Dec. 17, 1997

Related U.S. Application Data

[60] Provisional application No. 60/049,888, Jun. 17, 1997.
[51] Int. Cl.$^6$ ................................................... H04M 1/00
[52] U.S. Cl. ........................................ 379/394; 379/398
[58] Field of Search .................................. 379/394, 398, 379/413

[56] References Cited

U.S. PATENT DOCUMENTS

| | | | |
|---|---|---|---|
| 4,661,978 | 4/1987 | Hirata | 379/394 |
| 5,121,080 | 6/1992 | Scott et al. | 330/260 |
| 5,239,580 | 8/1993 | Bruno et al. | 379/443 |
| 5,504,811 | 4/1996 | Kiko et al. | 379/347 |
| 5,585,763 | 12/1996 | Navabi et al. | 330/255 |
| 5,747,893 | 5/1998 | Bennett et al. | 307/100 |

*Primary Examiner*—N. Le
*Assistant Examiner*—Shih-wen Hsieh
*Attorney, Agent, or Firm*—Thomas, Kayden, Horstemeyer & Risley, L.L.P.

[57] ABSTRACT

A method and apparatus for actively simulating an apparent termination input impedance to a current driven data communication equipment (DCE) device is disclosed. The DCE device utilizes several components to implement the apparent termination impedance. A first component is a current driver for providing a source of current within the DCE device. The current source is configured to actively drive an input-output signal line within a communication link. The current driven DCE also includes a mechanism for sensing an input-output signal line voltage, a mechanism for converting the sensed voltage to a feed back current and an active termination for simulating an apparent termination impedance. The converting mechanism is coupled to a summation node which sums current provided from the current driver and current from the converting mechanism to force the desired termination impedance in the DCE device, whilst performing DCE current drive function.

25 Claims, 3 Drawing Sheets

SYNTHETIC TERMINATION

CROSS REFERENCE TO RELATED APPLICATION

This document claims priority to and the benefit of the filing date of provisional application entitled SYNTHETIC TERMINATION, assigned Ser. No. 60/049,888, filed Jun. 17, 1997, and incorporates said provisional application herein by reference in its entirety.

FIELD OF THE INVENTION

The present invention relates generally to communication systems, and more specifically, to a system and method within the data communications art, wherein the system and method implements a synthetic local termination within a data communication equipment (DCE) device for the purpose of reducing transmission line driver requirements.

BACKGROUND OF THE INVENTION

Telephones, computers and other remote data terminal equipment (DTE) units convey information from one location to another over a DCE connection to a local subscriber loop, through the publicly switched telephone network (PSTN) and finally back through a receiving end local subscriber loop to complete a connection therebetween for as long as the voice or data communication takes place. In many scenarios, DCE devices transmit an analog signal over a conventional copper wire pair using a voltage driven configuration. Those typical scenarios entail quite long data communication lines and therefore require the DCE devices to include driver amplifiers. For example, in the local subscriber loop, a head end terminal at a driver end requires an amplifier, which requires a power source. Prior art DCE devices are voltage driven and require two termination impedances coupled in series for echo cancellation for proper data transmission and for sufficient audio quality in voice communications. The first impedance is located at the head end terminal or the first DCE device, and the second impedance is located at the second end of the line.

A primary disadvantage associated with this scenario is that as first end of the transmission line is driven, the local termination is also unnecessarily driven. This scenario results in wasted power, excessive driver power requirements allocated for DCE devices, and reduced linearity associated with the behavior of the DCE devices.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a method and apparatus for a current driven DCE device having a mechanism for actively simulating an apparent termination impedance for the purpose of reducing driver requirements. The DCE device utilizes several components to implement the apparent termination impedance.

A first component is a current driver for providing a source of current within the DCE device. The current source is configured to actively drive an input/output signal line within a local subscriber loop. The current driven DCE device also includes a mechanism for sensing input/output signal line voltage and an active termination mechanism for actively simulating an apparent termination impedance responsive to a input/output signal line voltage.

More specifically, the voltage sensing mechanism is coupled to the input/output signal line wherein the voltage sensing mechanism provides a voltage signal from the input/output signal line. The active termination device also includes a converting mechanism for converting the sensed voltage to a current. The active termination mechanism is responsive to the voltage sensing mechanism for actively simulating the apparent termination impedance. The current driven DCE also includes a summing node having an input coupled to the current driver and the current sensing mechanism and output coupled to the input/output signal line. The summing node sums current from the current driver and current from the converting mechanism to force the simulated termination impedance on a terminal end of the input/output signal line.

To provide a stable current source to the input/output signal line, the current driven DCE may also include a current driven current source coupled to the summing node output, wherein the current driven current source couples the summed current from the summing node output to the input/output signal line and provides a stable source of current to the input/output signal line.

In the preferred embodiment of the present invention, the current driven DCE device is coupled to a input/output signal line that includes tip and ring lines. In this embodiment, the voltage sensing mechanism may include a first operational amplifier having first and second input terminals coupled to the tip and ring lines, respectively, for sensing a voltage difference the tip and ring lines and a resistor coupled between an output terminal of the operational amplifier and an input to the driver control summation node for converting the sensed voltage into a current.

In the preferred embodiment of the present invention, the current driven current source may be defined by a second operational amplifier having first and second input terminals coupled to ground and the current driver, respectively, and an output terminal coupled to the tip line. The simulated termination impedance may be matched to any level. For example, in one embodiment the simulated termination impedance is equivalent to approximately 135 ohms for matching that of common telecommunication termination impedance requirements.

The present invention may also include method for simulating a termination impedance within a current driven communication equipment (DCE) device. In this regard, the steps of the method may include actively driving an input/output signal line in a local loop with a current driver, sensing the voltage across the input/output signal line, creating a input/output signal line current signal from the sensed voltage and actively simulating an apparent termination impedance within the DCE device responsive to the input/output signal line current signal.

In an embodiment where the current driven DCE device is interfaced to an input/output signal line which includes tip and ring lines, the steps of or creating the input/output signal line current signal step comprises the further steps of sensing a voltage difference the tip and ring lines, generating voltage signal responsive to the voltage difference, and converting the sensed voltage into a current for subsequent summing with output of a current driver current source to simulate the termination impedance.

The invention has numerous advantages, a few of which are indicated hereafter, as examples.

The synthetic termination allows the current source to look like the proper termination for any incoming signal.

An advantage of the present invention is that it dramatically reduces driver requirements in current transmission.

Another advantage of the present invention is that it reduces power consumption by reducing driver internal bias current.

Another advantage of the present invention is that affords improved linearity and facilitates integrated circuit implementation, especially in low voltage processes.

Other features and advantages of the present invention will become apparent to one of skill in the art upon review of the following drawings and the detailed description of the preferred embodiment.

BRIEF DESCRIPTION OF THE DRAWINGS

The present invention can be better understood with reference to the following drawings. The components in the drawings are not necessarily to scale, emphasis instead being placed on clearly illustrating the principles of the present invention.

DETAILED DESCRIPTION OF THE PREFERRED EMBODIMENT

Figure 1:
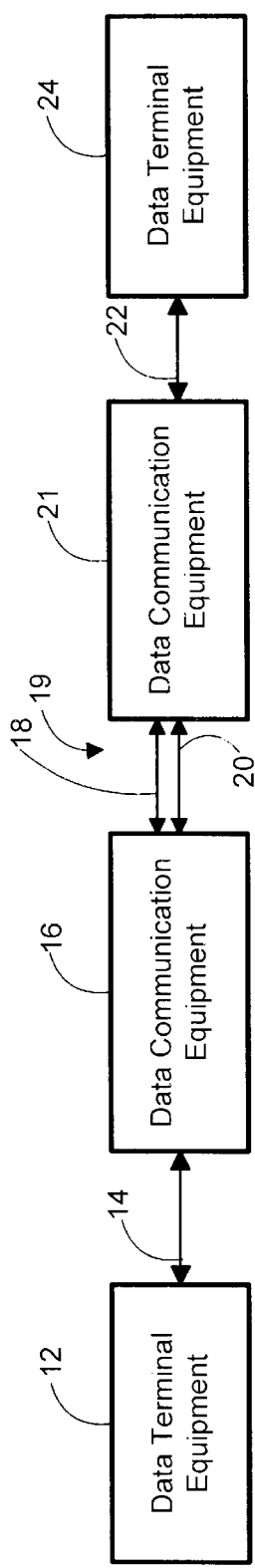
FIG. 1 is a block diagram illustrating the interrelationship between DTE and DCE devices coupled over a transmission line in the environment of a publicly switched telephone network (PSTN)

Having summarized the invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Turning now to the drawings, FIG. 1 illustrates a block diagram of a current driven DCE device 16 shown in context with communication lines and data terminal equipment (DTE) devices. More specifically, FIG. 1 illustrates DTE device 12 connected via serial line 14 to DCE device 16. DTE device 12 may comprise a number of devices, including, but not limited to a computer, printer, point-of-sale device, or a telephone. For example, where DTE device is a computer, DCE device 16 may comprise a modem and line 14 may comprise a serial connection between the DTE device 12 and the DTE device 16. DCE device 16 communicates with other DCE devices across input/output line 19. The input/output line 19 may typically be comprised of a two wire service, which wires are often denoted as TIP 18 and RING 20. Located at another end of input/output line 19 is DCE device 21 which communicates with DTE device 24 via line 22. As discussed above, DTE device 24 may comprise a number of devices, including, but not limited to a computer, printer, point-of-sale device, or a telephone, and DCE device 21 may comprise, but is not limited to, a modem.

Figure 2:
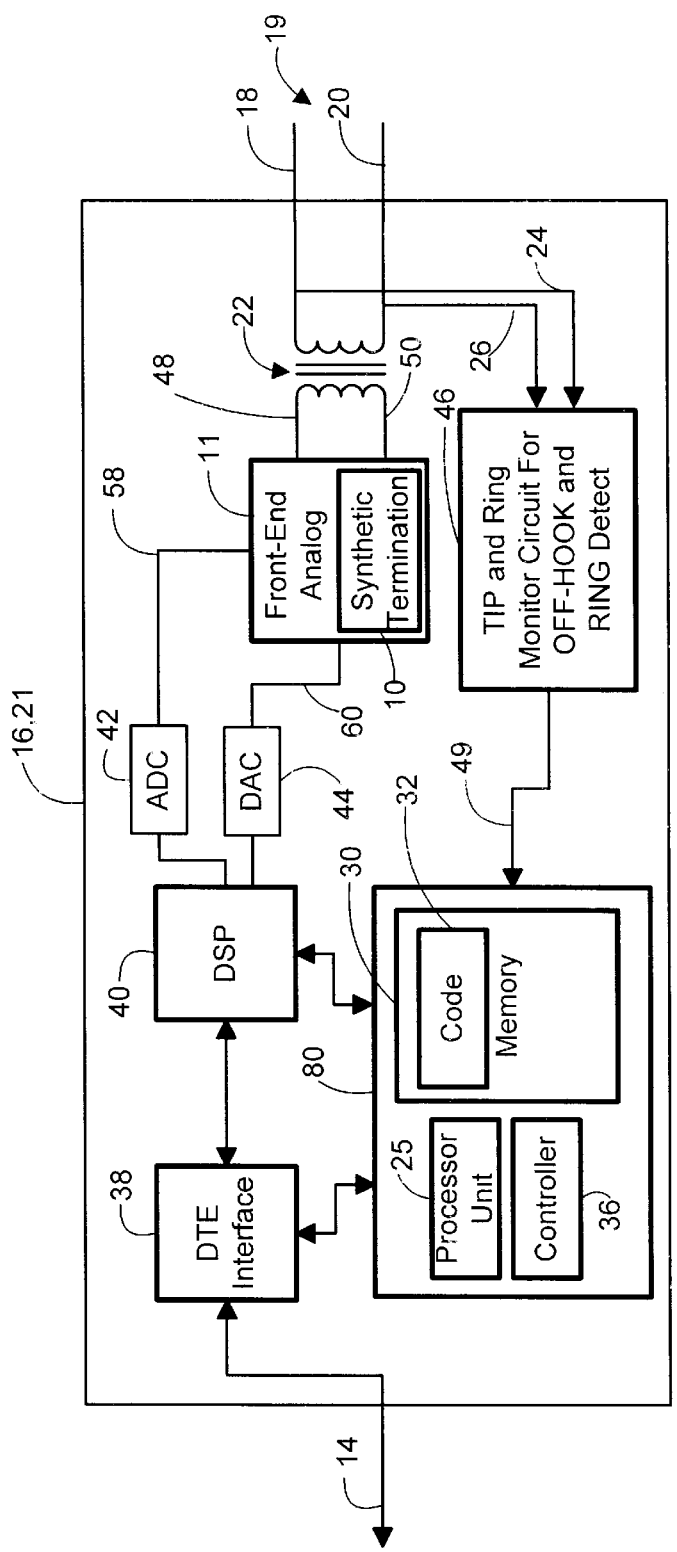
FIG. 2 is a block diagram illustrating a DCE device containing the concepts and features of the present invention.

FIG. 2 represents a schematic diagram of DCE devices 16 and 21. As discussed above, TIP 18 and RING 20 lines are coupled to an analog front-end circuit 11 which includes the simulated termination 10 via inductive coupling 22 and lines 48 and 50. A monitor circuit 46 includes a TIP and Ring monitor circuit for off-hook and ring detection via lines 24 and 26. The monitor circuit 46 then provides a signal representative of the status of tip and ring lines 18 and 20 via connection 49 to the main control module 80 of the DCE device.

Analog to digital circuitry 42 receives an analog communication signal from the front-end analog circuitry 11 for further processing by a digital signal processor (DSP) 40 via line 58. Additionally, DSP 40 provides a digital communication signal via line 60 to a front-end analog circuitry 11 for signaling over input/output line 19. Data received from the input/output line 19 passes through the analog front-end 11, line 58 and is converted from analog to digital form by the analog to digital converter of block 42, before being passed to the digital signal processor 40. Conversely, outgoing data output from the DSP 40 is converted by the digital to analog circuitry 44, before being communicated to input/output line 19, by way of the analog front-end 11. Finally, a DTE interface 38 is in communication with the DSP 40 and in further communication across line 14, with the DTE 12, such as a computer.

A control module 80 is in communication with the various other components of the DCE 16. While there are various ways to implement the control module 80, one way, as illustrated, is to further partition the control module 80 into functional units denoted as a processing unit 25, a memory 30 (which may further include an executable code segment 32) and a controller 36.

For purposes of the broad concepts of the present invention, the controller 80 receives a signal from the monitor circuit 46 on line 49, that signal will then provide controller 80 with information necessary to control the DSP 40 for the receipt and transmission of data. In this regard, the monitor circuitry 46 may be configured to detect an OFF-HOOK condition or alternatively a RING condition via lines 24 and 26. As is known in the art, the OFF-HOOK condition may be detected by a drop in voltage across the TIP and RING lines 18 and 20 within input/output line 19, or alternatively a sudden chance in impedance on the input/output line 19. On the other hand, a RING detect condition is identified by a low frequency oscillatory voltage on input/output line 19. In short, the controller 80 evaluates the signal received on input/output line 19 for the purpose of controlling the DSP 40 and related componentry. Appropriate signals may, accordingly, be transmitted to the DSP for formulating data transmissions (or interpreting received data transmissions).

In accordance with an alternative embodiment of the invention, it will be appreciated that the analog to digital converter 42 and digital to analog converter 44 may be implemented as part of the DSP 40, to generate a signal in digital format which may be more readily evaluated and processed by the DSP 40. Additionally, the controller 80 may be a microprocessor, a microcontroller, an application specific integrated circuit (ASIC) or other digital circuitry configured to specially processed information. In the illustrated embodiment, the controller 80 includes fundamental components (processor unit 25, controller 36, memory 30) that together operate to perform distinct computing operations. Such operations may be controlled, for example, by executable code 32 contained within the memory 30.

Figure 3:
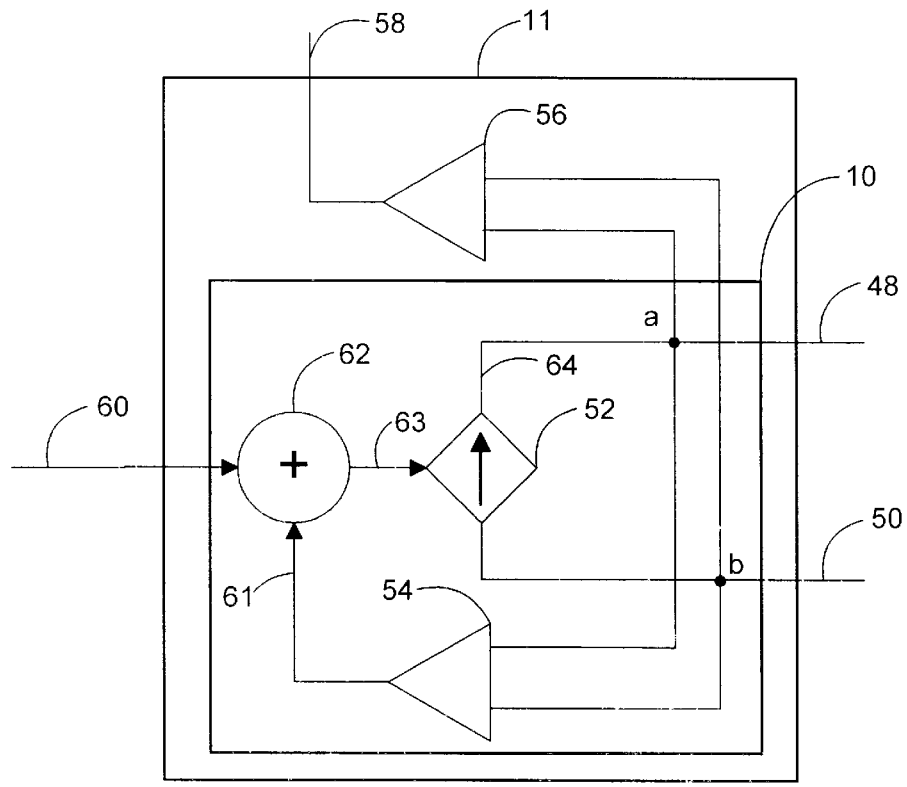
FIG. 3 is a schematic diagram illustrating the primary components of a synthetic termination constructed in accordance with the present invention.

Turning now to FIG. 3, a synthetic termination circuitry module 10 within the front end analog circuitry 11 is illustrated. In accordance with one embodiment of the present invention, a current driven current source 52 drives the transmission lines 48 and 50. The current driver current source 52 typically has a current gain, for example, current through line 64 divided by current through line 63 is greater than unity. A feedback mechanism 54 senses the voltage difference between point a and point b, converts that voltage difference into an appropriate current, and feeds that current into control summation node 62. Line 60 transmits current from a current source (not shown) to control summation node 62. Control summation node 62 then provides current to the current driven current source 52 to force the impedance across the termination. Thus, feedback mechanism 54 and driver control summation node 62 force an apparent impedance. Thus, any transmission line coupled to the DCE device 16 or 21 senses a termination impedance simulated by the synthetic termination 10. For example, in one embodiment synthetic termination 10 forces an apparent input impedance to the DCE device 16 of approximately 135 ohms. In that embodiment, the driver load is the only high-valued resistor of 13500 ohms, plus the transmission line of approximately 135 ohms. In the absence of the present invention embodied in the synthetic termination circuitry 10, a current driver would have to drive the 135 termination ohm plus the 135 ohm transmission line (assuming the termination impedances are arranged in a parallel configuration in the current driven environment), resulting in a total of a 67.5 ohm load and about twice the drive current. Although an apparent input impedance of 135 ohms is cited as an example of a simulated termination impedance in the present invention, the ordinarily skilled artisan will understand that discreet componentry may be arranged such that any desired input impedance may be achieved.

Figure 4:
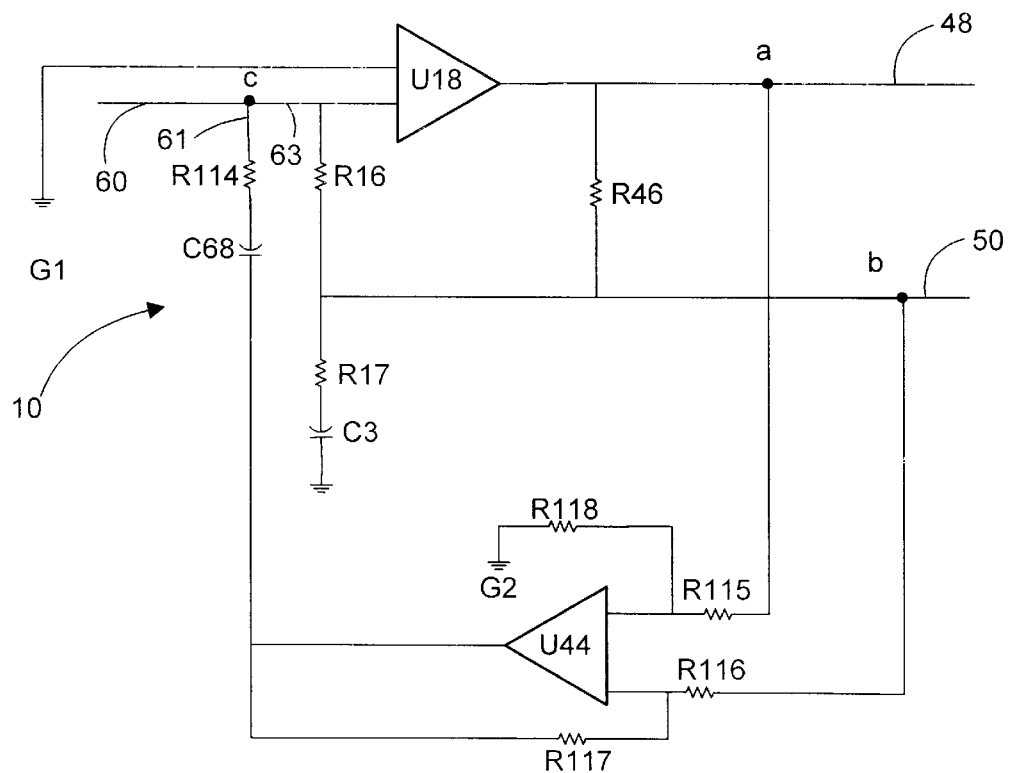
FIG. 4 is a circuit diagram illustrating the analog circuitry of the synthetic termination schematically illustrated in FIG. 4.

FIG. 4 illustrates an arrangement of discreet analog componentry which may be arranged to implement the above-referenced simulated termination impedance. Operational amplifier U18 and resistors R46, R16, R17 and capacitor C3 form the current driven current source 52. Additionally, operational amplifier U44 and resistors R118, R115, R116 and R117 form a portion of the feedback mechanism 54. Specifically, that group of components comprising feedback mechanism 54 senses a voltage drop across nodes A and B and sends a voltage signal to coupling capacitor C68 and through resistor R114. Resistor R114 converts the amplified voltage signal from operational amplifier U44 into a current signal on line 61. Line 60 receives current from a current driver (not shown) and node C functions as the driver control summation node 62 as shown in FIG. 3. Table 1 below lists the values of resistors and/or serial numbers of operational amplifiers set out in FIG. 4. Those values are chosen to simulate an input termination impedance of approximately 135 ohms for the data communication equipment devices 16 and 21.

| Component Identification No. | Component Valve/Serial No. |
|---|---|
| Resistor R46 | 13500 ohms |
| Resistor R118 | 100 kohms |
| Resistor R115 | 100 kohms |
| Resistor R116 | 100 kohms |
| Resistor R117 | 100 kohms |
| Resistor R17 | 10 ohms |
| Resistor R16 | 60.4 ohms |
| Resistor R114 | 845 ohms |
| Capacitor C3 | 47μ |
| Capacitor C68 | 10μ |
| Op-Amp U18 | LM6171 |
| Op-Amp U44 | LM6124B/NS |

The discreet component analog circuitry of FIG. 4 illustrates an embodiment where a 135 ohm termination is simulated in a load resistance of 13,500 in resistor R46 is utilized. However, the ordinarily skilled artisan will understand that load resistances as well as gain values achieved by the feedback mechanism 54 may be changed to simulate other impedance values.

The synthetic, active termination circuitry reduces transmission output power by synthesizing termination by the active components described above. Additionally, this synthetic termination may synthesize any level of impedance depending upon the value and nature of the discreet componentry which is chosen for the circuit. Furthermore, the current driver circuitry requires approximately one-half the current normally needed without such a synthetic termination. For example, prior art configurations terminate each end of the communication transmission line in series for echo and noise control. In the front-end analog circuitry of the present invention the local termination is not necessarily driven in the DCE devices 16 and 21, which reduces power consumption associated therewith. Furthermore, the inventive synthetic termination dramatically reduces driver requirements in current transmission by reducing driver internal bias current. In turn, the invention affords improved linearity to behavior of the data communication equipment device.

The synthetic termination in accordance with the present invention has particular utility in a current driven DCE environment. As mentioned above, prior art DCE devices generally utilize voltage signaling techniques and termination resistances in series to achieve line connection. That prior art signaling method generally limits communication to two DCE devices coupled across a single local subscriber loop at one time. The current driven environment allows for several DCE devices within a customer premises to communicate simultaneously over a single local subscriber loop.

Figure 5:
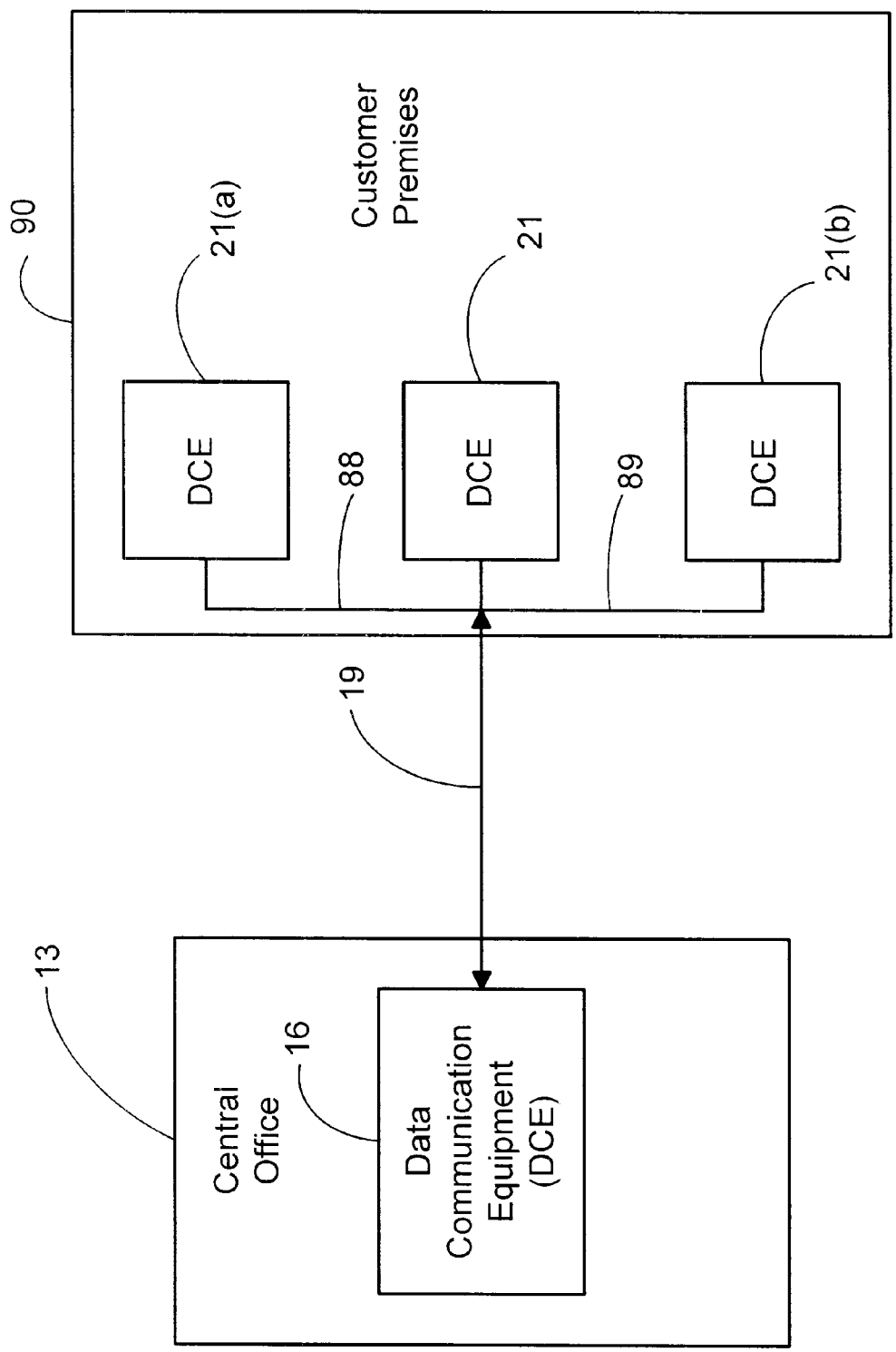
FIG. 5 is a block diagram illustrating several DCE devices containing the concepts and features of the present invention.

Referring to FIG. 5, initially, a connection is established between current driven DCE devices 16, and 21, 21(a) and 21(b), wherein DCE devices 16, 21, 21(a) and 21(b) each have synthetic termination circuitry as described above, which may be utilized on demand as described below. DCE device 16 terminates one end of input/output line 19 and either DCE device 21, 21(a) or 21(b) terminates the other end of input/output line 19 using the synthetic termination as described above. For illustrative purposes only, assume DCE device 21 terminates the customer premises end 90 of input/output line 19. In this case, DCE devices 21(a) and 21(b) are bridged (connected in parallel) to input/output line 19 such that any signal transmitted by DCE device 16 is simultaneously received by DCE devices 21, 21(a) and 21(b). Furthermore, it is assumed that DCE devices 21, 21(a) and 21(b) are capable of determining which signals transmitted by DCE device 16 are destined for DCE devices 21, 21(a) and 21(b), respectively. Therefore, each of DCE devices 21, 21(a) and 21(b) only processes the signals that are destined for it. Thus, any one of DCE devices 21, 21(a) and 21(b) may first terminate input/output line 19 using the synthetic termination as discussed above for making the proper connection. Subsequently, the remaining DCE devices may then simply communicate over input/output line 19 using a current driven signaling configuration while bridged to input/output line 19 without a termination. Current driven signaling without effecting synthetic termination may be achieved with the present invention by simply disconnecting current signal line 61 in FIG. 3, or equivalently, setting the value of R114 sufficiently large. Therefore, the ordinarily skilled artisan will understand and recognize that only one of the group of DCE devices in customer premises 90 terminates input/output line 19 while the other DCE devices are bridged to the input/output line 19. The ordinarily skilled artisan will also understand that the present invention may be implemented in any environment and are not limited to operation at a central office 13 and a customer premises 90.

In addition to enabling data communication across input/output line 19, data communication directly between DCE devices in customer premises 90 is possible. When intra-customer premises input/output 88 and 89 are sufficiently less than one-forth (¼) wavelength of the highest data signal, DCE devices 21, 21(a), and 21(b) may communicate with terminations and bridge connections as described above. When input/output line 88 approaches or exceeds one-fourth (¼) wavelength of the data signal, DCE device 21(a) should be configured to synthetic termination mode, as described herein. That same methodology applies to input/output line 89, or any plurality of long input/output lines.

As described above, the current driven DCE in combination with a synthetic termination allows multiple DCE devices to be connected to a single input/output line 19 as described above, which greatly expands utilization of the input/output line 19.

Another unique feature of the current driven DCE devices as described above is that they allow for the termination of an input/output line while accepting a transmit signal from a DSP 40 through a digital to analog converter 44 in the current driven signaling configuration.

Another important feature of the present invention is that the input impedance (Z) for the subject invention is of a low parameter sensitivity. More specifically, the above-described discrete analog components which control the impedance are of low parameter sensitivity which increases manufacturability of the synthetic termination device. For example, since the synthetic termination componentry has a low overall component sensitivity, larger tolerances in the values of specific components may be accommodated in the synthetic termination without departing from predetermined quality standards. Sensitivity S is represented as follows:

$$S^Z_{Comp} = (Comp/Z) \times \frac{\partial z}{\partial Comp}$$

$$S^Z_{Comp} = \left[\frac{Comp}{Z}\right] \frac{\partial Z}{\partial Comp}$$

In the present invention, a sensitivity range of −1.0 to +1.0 is acceptable. For example, if the sensitivity of Z with respect to component (comp) were +1.0, and if the value of a comp goes up by one percent (1%), with design termination impedance (Z) of 100 ohms, the resulting termination impedance would increase by one percent (1%) to 101 ohms. In the present invention, the sensitivity of Z to current driven current source 52 gain is −0.992. Similarly, the sensitivity of Z to feedback mechanism 54 is −0.992. Furthermore, the sensitivity of Z to resistor R114 is 0.992. Finally, the sensitivity Z to resistor R46 is 0.007. Thus, each component of the inventive synthetic termination has a very low parameter sensitivity which allows the synthetic termination impedance to remain quite consistent regardless of specific component values with acceptable tolerances.

It will be obvious to those skilled in the art that many modifications and variations may be made to the preferred embodiments of the present invention, as set forth above, without departing substantially from the principles of the present invention. All such modifications and variations are intended to be included herein within the scope of the present invention, as defined in the claims that follow.

We claim:

1. An active termination circuit for creating a synthetic termination in a data communications device, comprising:

a current driver for providing a current signal within the data communications device for actively driving an input/output signal line on a communication link; and a voltage mechanism for generating a line voltage signal proportional to an input/output signal line voltage on the input/output signal line, wherein an output of the voltage mechanism is applied to an input of the current driver.

2. The circuit of claim 1, further comprising a converting mechanism coupled to the voltage mechanism, wherein the converting mechanism converts the line voltage signal into a current signal to control the active termination mechanism for actively simulating the apparent termination impedance.

3. The circuit of claim 2, further comprising a summing node having a current source output, and an output of the converting mechanism coupled thereto, wherein said summing node sums a source current from the current source and the current signal from the converting mechanism to simulate the termination impedance.

4. The circuit of claim 3, wherein the current driver further comprises a current driven current source coupled to the summing node, wherein the current driven current source couples the summed current from the summing node to the input/output signal line.

5. The circuit of claim 4, wherein:

the input/output signal line includes tip and ring lines;

the voltage mechanism comprises a first operational amplifier having first and second input terminals coupled to the tip and ring lines, respectively, for amplifying a voltage difference the tip and ring lines; and the converting mechanism comprises a resistor coupled between an output terminal of the operational amplifier and the summing node for converting the line voltage signal into a current signal.

6. The circuit of claim 2, wherein the current driven current source further comprises a second operational amplifier having first and second input terminals coupled to ground and the summing node, respectively, and an output terminal coupled to the tip line.

7. The circuit of claim 1, wherein the active termination circuit simulates a termination impedance equivalent to approximately 135 ohms.

8. A method for simulating a termination impedance within a data communications device comprising the steps of:

actively driving an input/output signal line in a communication link with a current driver;

sensing an input/output signal line voltage;

creating a input/output signal line current proportional to the input/output signal line voltage; and actively simulating an apparent termination impedance within the data communications device with the input/output signal line current signal.

9. The method of claim 8, further comprising the step of summing a current from a data terminal equipment and the input/output signal line current signal to actively create the termination impedance.

10. The method of claim 9, wherein the input/output signal line to the data communications device includes tip and ring lines, wherein the steps of creating the input/output signal line current step comprises the further steps of:

determining a voltage difference the tip and ring lines; and generating voltage signal responsive to the voltage difference; and converting the voltage difference into a current.

11. The method of claim 8, further comprising the step of simulating a termination impedance equivalent to approximately 135 ohms.

12. A termination circuit for creating a synthetic termination impedance in a data communications device, comprising:

a current driver means for providing a current signal within the data communications device for actively driving an input/output signal line on a communication link; and voltage generation means for generating a line voltage signal proportional to an input/output signal line voltage on the input/output signal line, wherein an output of the voltage generation means is applied to an input of the current driver means.

13. The termination circuit of claim 12, further comprising a converting means coupled to the voltage generation means, wherein the converting means converts the line voltage signal to a current for actively simulating the synthetic termination impedance.

14. The termination circuit of claim 13, further comprising a summing node means coupled to the current driver and an output of the converting means, wherein said summing node means sums current from an external current source and the current from the converting means to create the termination impedance.

15. The termination circuit of claim 14, wherein the current driver means further comprises a current driven current source means coupled to the summing node means, wherein the current driven current source means couples the summed current from the summing node means to the input/output signal line.

16. The termination circuit of claim 15, wherein:

the input/output signal line includes tip and ring lines;

the voltage generation means includes a first operational amplifier having first and second input terminals coupled to the tip and ring lines, respectively, for determining a voltage difference the tip and ring lines; and the converting means includes a resistor coupled between an output terminal of the first operational amplifier and an input to the summing node means for converting the voltage difference into a current.

17. The termination circuit of claim 13, wherein the current driven current source means further comprises a second operational amplifier having first and second input terminals coupled to ground and the summing node means, respectively, and an output terminal coupled to the tip line.

18. The termination circuit of claim 12, wherein the simulated termination impedance is equivalent to approximately 135 ohms.

19. An active termination circuit for creating a synthetic termination in a data communications device, comprising:

a current controlled current source having an output configured for coupling to a local loop, the current controlled current source having an input defining a summing junction;

a voltage amplifier having a pair of differential inputs configured for coupling to a tip and a ring, respectively, of the local loop;

a converter circuit coupling an output of the voltage amplifier to the summing junction; and a current source input coupled to the summing junction to receive a transmitted current signal from a data terminal equipment.

20. The circuit of claim 19, wherein the converter circuit further comprises a capacitor and a resistor coupled in series.

21. A termination circuit for creating a synthetic termination in a data communications device, comprising:

a current controlled current source having an line output configured for coupling to a communications link, the current controlled current source having an input defining a summing node;

a voltage amplifier having a line input coupled to the line output and a voltage output; and a converter circuit coupling the volt output of the voltage amplifier to the summing node, wherein the summing node is configured to receive a current signal generated by the data communications device.

22. The circuit of claim 21, wherein the converter circuit further comprises a capacitor and a resistor coupled in series.

23. A circuit for creating a synthetic termination in a data communications device, comprising:

a current controlled current source having a line output configured for coupling to a communications link, the current controlled current source having an input defining a summing node, the current controlled current source being configured to generate an output signal; and a voltage amplifier circuit having at least one input coupled to the line output and a feedback output coupled to the summing node, the voltage amplifier circuit being configured to generate a current signal proportional to the output signal.

24. The circuit of claim 23, wherein the voltage amplifier circuit further comprises:

a voltage amplifier having at least one input coupled to the line output and a voltage output; and a converter circuit coupled between the voltage output and the feedback output, the converter circuit being configured to convert a voltage signal into a current signal.

25. The circuit of claim 24, wherein the converter circuit further comprises a capacitor and a resistor coupled in series.

* * * * *

United States Patent And Trademark Office
CERTIFICATE OF CORRECTION

PATENT NO. : 5,999,619
DATED : December 7, 1999
INVENTOR(S): Bingel

It is certified that error appears in the above-identified patent and that said Letters Patent is hereby corrected as shown below.

Col. 8, line 51, after "difference", insert -- across --.
Col. 8, line 54, before "operational", insert -- first --.
Col. 9, line 19, after "generating", insert -- a --.
Col. 9, line 32, before the first instance of "voltage", insert -- a --.
Col. 9, line 44, after "driver", insert -- means --.
Col. 9, line 60, after "difference", insert -- across --.
Col. 10, line 28, after "having" replace "an" with -- a --.
Col. 10, line 34, replace "volt" with -- voltage --.

Signed and Sealed this

Twelfth Day of December, 2000

Attest:

Q. TODD DICKINSON

Attesting Officer

Director of Patents and Trademarks